(12) United States Patent
Kimura

(10) Patent No.: US 9,247,125 B2
(45) Date of Patent: Jan. 26, 2016

(54) AUXILIARY LIGHT PROJECTION APPARATUS, FLASH APPARATUS, AND PHOTOGRAPHING APPARATUS

(71) Applicant: Samsung Electronics Co., Ltd., Gyeonggi-do (KR)

(72) Inventor: Makoto Kimura, Yokohama (JP)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 219 days.

(21) Appl. No.: 14/101,531

(22) Filed: Dec. 10, 2013

(65) Prior Publication Data

US 2014/0160344 A1 Jun. 12, 2014

(30) Foreign Application Priority Data

Dec. 11, 2012 (JP) .................................. 2012-270053
Nov. 8, 2013 (KR) ......................... 10-2013-0135687

(51) Int. Cl.
*H04N 5/232* (2006.01)
*G02B 7/32* (2006.01)
*G03B 13/36* (2006.01)
*H04N 5/225* (2006.01)

(52) U.S. Cl.
CPC .............. *H04N 5/23212* (2013.01); *G02B 7/32* (2013.01); *G03B 13/36* (2013.01); *H04N 5/2256* (2013.01)

(58) Field of Classification Search
CPC ...... G01B 11/25–11/2545; G02B 7/04–7/105; G02B 7/28–7/40; G03B 13/36; G03B 15/02–15/07; G03B 2215/05–2215/0596; H04N 5/2256; H04N 5/23212; G06K 2209/401; G06K 9/2027; G06K 9/2036; G06K 9/4661; G06T 7/0057
See application file for complete search history.

(56) References Cited

U.S. PATENT DOCUMENTS

| 4,687,326 | A | * | 8/1987 | Corby, Jr. ........... G01B 11/2536 348/169 |
| 4,801,963 | A | * | 1/1989 | Koyama ................... G02B 7/32 250/201.4 |
| 5,262,819 | A | * | 11/1993 | Ohtaka .................. G02B 7/346 396/114 |
| 5,278,602 | A | * | 1/1994 | Honma ..................... G02B 7/32 396/106 |
| 5,850,578 | A | * | 12/1998 | Ohmura .................... G02B 7/32 396/106 |
| 6,376,139 | B1 | * | 4/2002 | Fujisawa ............. G03F 7/70625 430/30 |
| 6,884,552 | B2 | * | 4/2005 | Mieher ................ G06K 7/0095 356/401 |
| 7,384,160 | B2 | * | 6/2008 | Matsumoto .............. G02B 7/36 348/E5.137 |

(Continued)

FOREIGN PATENT DOCUMENTS

JP 63-291042 A 11/1988
JP 3241868 B2 10/2001

(Continued)

*Primary Examiner* — Dennis Hogue
(74) *Attorney, Agent, or Firm* — Cha & Reiter, LLC

(57) ABSTRACT

An auxiliary light projection system employed by a camera having an auto-focus detection unit, comprises a light pattern generator configured to generate an auto-focus detection pattern. The auto-focus detection pattern comprises a first pattern region and a second pattern region that is denser than the first pattern region, and a center of the first pattern region and a center of the second pattern region are separated by a distance determined in response to difference in visual characteristics of the auto-focus detection pattern between when viewed from (i) from an axis through the lens of a camera and (ii) from an axis through a focus pattern projection source. A light pattern projection source configured to project the generated auto-focus detection pattern onto a subject enabling auto-focus detection.

20 Claims, 8 Drawing Sheets

(56) References Cited

U.S. PATENT DOCUMENTS

| | | | |
|---|---|---|---|
| 7,558,474 B2 | 7/2009 | Sasagawa | |
| 2002/0018219 A1* | 2/2002 | Hallerman | G01N 21/8806 356/604 |
| 2002/0131029 A1* | 9/2002 | Uchiyama | G02B 7/28 355/56 |
| 2005/0231820 A1* | 10/2005 | Miyasaka | G02B 7/282 359/686 |
| 2009/0010632 A1 | 1/2009 | Cho et al. | |

FOREIGN PATENT DOCUMENTS

| | | |
|---|---|---|
| JP | 2005-338387 A | 12/2005 |
| JP | 2006-163174 A | 6/2006 |
| JP | 2006-243003 A | 9/2006 |
| JP | 2006-267768 A | 10/2006 |
| JP | 2007-79248 A | 3/2007 |
| JP | 3936131 B2 | 3/2007 |
| JP | 2010-8689 A | 1/2010 |
| JP | 4800827 B2 | 8/2011 |
| JP | 4872421 B2 | 12/2011 |

* cited by examiner

US 9,247,125 B2

AUXILIARY LIGHT PROJECTION APPARATUS, FLASH APPARATUS, AND PHOTOGRAPHING APPARATUS

CROSS-REFERENCE TO RELATED APPLICATIONS

This application claims priority from Japanese Patent Application No. 2012-270053 filed Dec. 11, 2012 in the Japan Patent Office, and priority from Korean Patent Application No. 10-2013-0135687 filed Nov. 8, 2013 in the Korean Intellectual Property Office, the disclosures of which are incorporated herein by reference in their entirety.

BACKGROUND

1. Technical Field

The present disclosure relates to an auxiliary light projection apparatus, a flash apparatus, and a photographing system.

2. Description of the Related Art

A known auxiliary light projection system is mounted to or built in a camera having an auto-focus detection device, projects a focus detection pattern as an auxiliary light on a subject, and allows the auto-focus detection device to detect the focus detection pattern reflected from the subject. The focus detection pattern is compact in a region near the center of a photographing screen, and is sparse in the remaining region of the photographing screen. Accordingly, even if a wide-angle lens or a telephoto lens is used, the relationship between an auto-focusing area and the focus detection pattern can be adjusted so that the auto-focus detection may be performed accurately. However, since the auxiliary light projection apparatus is placed away from a photographing lens, movement of the auto-focusing area to be within the focus detection pattern depends on a focus distance. In the known system, when the focus distance is large, the center of the auto-focusing area deviates from the compact region of the focus detection pattern. As a result, sufficient accuracy of the auto-focus detection by the auxiliary light projection may not be obtainable.

SUMMARY

A system improves robustness of an auto-focus detection pattern in response to change of focus distance using an auxiliary light projection apparatus that is mounted to or built in a photographing apparatus having an auto-focus detection device, and projects an auto-focus detection pattern onto a subject as auxiliary light enabling the auto-focus detection device to perform auto-focus detection. The auto-focus detection pattern may include a sparse pattern region, and a compact pattern region that is denser than the sparse pattern region and in the auto-focus detection pattern, a center coordinate of the sparse pattern region and a center coordinate of the compact pattern region may be spaced apart but arranged in accordance with parallax between a photographing optical system of the photographing apparatus and a projection system of the auxiliary light projection apparatus.

An auxiliary light projection system employed by a camera having an auto-focus detection unit, comprises a light pattern generator configured to generate an auto-focus detection pattern. The auto-focus detection pattern comprises a first pattern region and a second pattern region that is denser than the first pattern region, and a center of the first pattern region and a center of the second pattern region are separated by a distance determined in response to difference in visual characteristics of the auto-focus detection pattern between when viewed (i) from an axis through the lens of a camera and (ii) from an axis through a focus pattern projection source. A light pattern projection source configured to project the generated auto-focus detection pattern onto a subject enabling auto-focus detection.

In a feature, the visual characteristics comprises at least one of, position, direction, size and orientation of the auto-focus detection pattern and the first pattern region is larger than the second pattern region and encompasses the second pattern region and the visual characteristics result from parallax associated with separation of the lens of the camera and the focus pattern projection source. Also, in the auto-focus detection pattern, the second pattern region is arranged longitudinally along an epipolar line determined in response to the difference in the visual characteristics and wherein the center of the second pattern region is substantially on or close to the epipolar line.

In another feature, an auxiliary light projection system employed by a camera having an auto-focus detection unit, comprises a light pattern generator and a light pattern projection source. The light pattern generator is configured to generate an auto-focus detection pattern, comprising a first pattern region, a second pattern region that is denser than the first pattern region, and a third pattern region that is denser than the second pattern region, and a center of the first pattern region, a center of the second pattern region and a center of the third pattern region are separated by a distance determined in response to difference in visual characteristics of the auto-focus detection pattern between when viewed (i) from an axis through the lens of a camera and (ii) from an axis through a focus pattern projection source. The light pattern projection source is configured to project the generated auto-focus detection pattern onto a subject enabling auto-focus detection.

In a further feature, the first pattern region is larger than the second pattern region and encompasses the second pattern region and the second pattern region is larger than the third pattern region and encompasses the third pattern region and the visual characteristics result from parallax associated with separation of the lens of the camera and the focus pattern projection source. In the auto-focus detection pattern, the second pattern region and the third pattern region are arranged longitudinally along an epipolar line determined in response to the difference in the visual characteristics and wherein the center of the second pattern region and the center of the third pattern region are substantially on or close to the epipolar line.

In yet another feature, a flash system is mounted to camera having an auto-focus detection device, and emits a flash light. The flash system comprises the light pattern generator and the light pattern projection source.

In an additional feature, a flash system comprising the light pattern generator and the light pattern projection source, is mounted to a photographing system having an auto-focus detection device, and emits a flash light based on an operation instruction of the photographing system, the flash system.

In yet a further feature, a photographing system having an auto-focus detection device, comprises the light pattern generator and the light pattern projection source.

In yet another additional feature, a photographing system comprises, an auto-focus detection device included in the photographing system; a photographing lens disposed in a front surface of the photographing system. A flash system that is disposed at a top and side of the photographing lens in the photographing system, comprises an auxiliary light projection system to project an auto-focus detection pattern as an auxiliary light onto a subject enabling the auto-focus detection device to automatically detect focus. The auto-focus detection pattern, comprises a first pattern region, a second pattern region that is denser than the first pattern region, and a third pattern region that is denser than the second pattern region. The first pattern region is larger than the second pattern region and encompasses the second pattern region, the second pattern region is larger than the third pattern region and encompasses the third pattern region and a center of the first pattern region, a center of the second pattern region and a center of the third pattern region are separated by a distance determined in response to difference in visual characteristics of the auto-focus detection pattern between when viewed (i) from an axis through the photographing lens and (ii) from an axis through a focus pattern projection source.

In another feature, the auto-focus detection pattern, the second pattern region and the third pattern region are arranged longitudinally along an epipolar line determined in response to the difference in the visual characteristics and the center of the second pattern region and the center of the third pattern region are substantially on or close to the epipolar line where the epipolar line is a straight line that is inclined in the auto-focus detection pattern.

BRIEF DESCRIPTION OF THE DRAWINGS the system features will become apparent and more readily appreciated from the following description, taken in conjunction with the accompanying drawings of which:

Throughout the drawings, like reference numerals will be understood to refer to like parts, components and structures.

DETAILED DESCRIPTION

Hereinafter, certain exemplary embodiments of the present disclosure will be described in detail with reference to the accompanying drawings. The matters defined herein, such as a detailed construction and elements thereof, are provided to assist in a comprehensive understanding of this description. Well-known functions or constructions are omitted to provide a clear and concise description of exemplary embodiments. Further, dimensions of various elements in the accompanying drawings may be arbitrarily increased or decreased for assisting in a comprehensive understanding. As used herein the term parallax comprises the effect whereby the appearance of visual characteristics (position, direction, size and/or orientation), of an object (a focus pattern), differs when viewed from different positions, e.g., from an axis through the lens of a camera and from an axis through the focus pattern projection source. Hereinafter, an back-projection line is a line comprising a 3D line of sight to an object from a first viewpoint and is seen as just a point at the first viewpoint, but seen as a line when viewed from a second viewpoint where the first and second viewpoints are separated by a distance. As used herein an epipolar line is a line seen from the second viewpoint.

Figure 1:
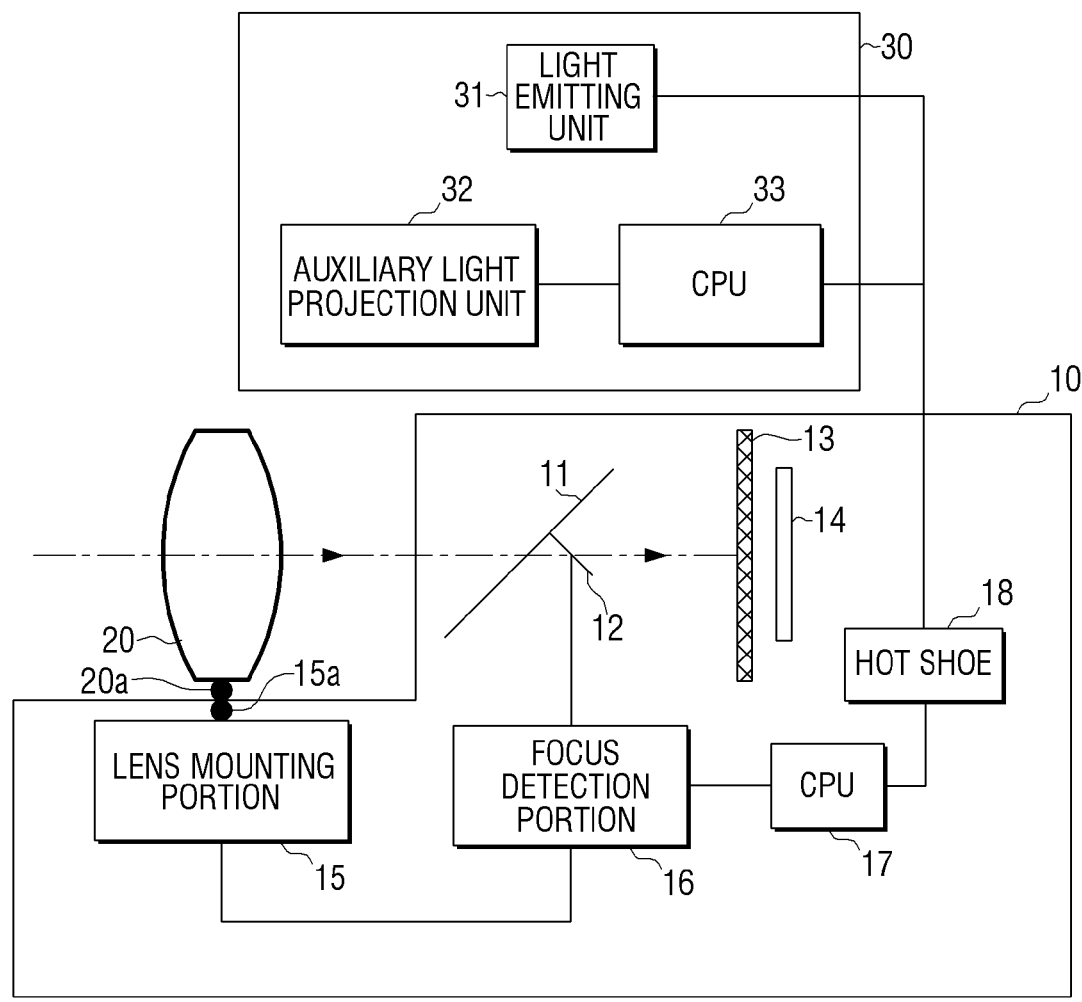
FIG. 1 shows a camera equipped with a flash apparatus according to invention principles.

In FIG. 1, a camera (a photographing apparatus) 10 may be, for example, a single lens reflex camera configured so that a photographing lens 20 of a photographing optical system can be removed. Alternatively, the camera 10 may be a compact digital camera instead of the single lens reflex camera. The camera 10 includes a quick return mirror 11, a sub mirror 12, a shutter 13, an imaging component 14, a lens mounting portion 15, a focus detection portion (an auto-focus detection device) 16, a central processing unit (CPU) 17, and a hot shoe 18 (a bracket on a camera body that provides support and electrical contact for an electronic flash attachment). The photographing lens 20 is removably disposed in the camera 10 through the lens mounting portion 15, and may include a telephoto lens having a long focus distance, a wide-angle lens having a short focus distance, a zoom lens having a variable focus distance, for example. In the following description, the wide-angle lens and the telephoto lens includes the wide-angle side and the telephoto side of the zoom lens. A contact portion 15a that may be electrically connected to a contact portion 20a disposed in the photographing lens 20 is disposed in the lens mounting portion 15.

Figure 2:
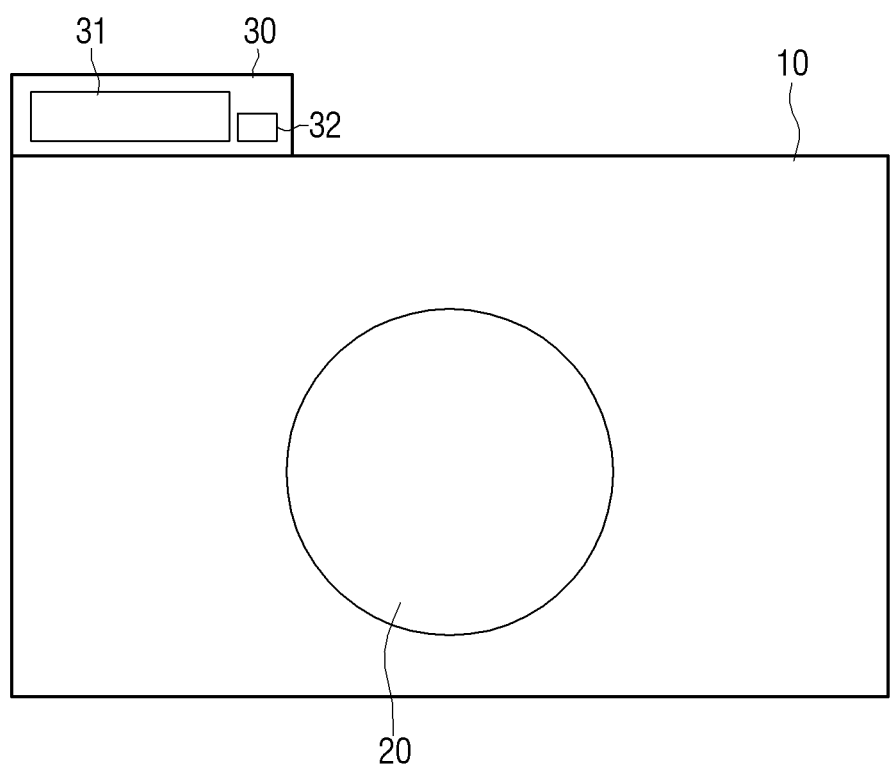
FIG. 2 shows a front view of a camera equipped with a flash apparatus according to invention principles.

However, the pattern of the high resolution near the epipolar line E may be effectively used as the pattern for the auto-focus detection. Accordingly, according to the present disclosure, the resolution of the auto-focus detection pattern P is changed properly according to the change of the focus distance so that the auto-focus detection may be performed easily regardless of the change of the focus distance. As a flash attached to the outside of the camera 10, a flash apparatus 30 is attached to the camera 10 through the hot shoe 18 which is a synchro contact. The flash apparatus 30 is associated with camera 10. The flash apparatus 30 may be an apparatus for the exclusive use of the camera 10 or an apparatus that can be used for multiple cameras including the camera 10. The flash apparatus 30 includes a light emitting unit 31 (a light pattern projection source) to emit a flash light for illuminating a subject, an auxiliary light projection unit 32 to generate an auto-focus detection pattern P and to project the generated auto-focus detection pattern P (see FIG. 3) using auxiliary light, and a central processing unit (CPU) 33. As illustrated in FIG. 2, when being viewed from the front of the camera 10, the flash apparatus 30 is disposed on the top of the left side of the photographing lens 20. Accordingly, the auxiliary light projection unit 32 is disposed on the top of the left side of the photographing lens 20, when it is viewed from the front of the camera 10. Light from a subject enters through the photographing lens 20 is divided into a finder system (not illustrated) and a focus detection system by the quick return mirror 11. The light conveyed towards the finder system is guided to a finder unit (not illustrated) which a photographer looks at through an optical system such as, for example, a finder screen, a pentaprism, an eye piece, for example.

Figure 3:
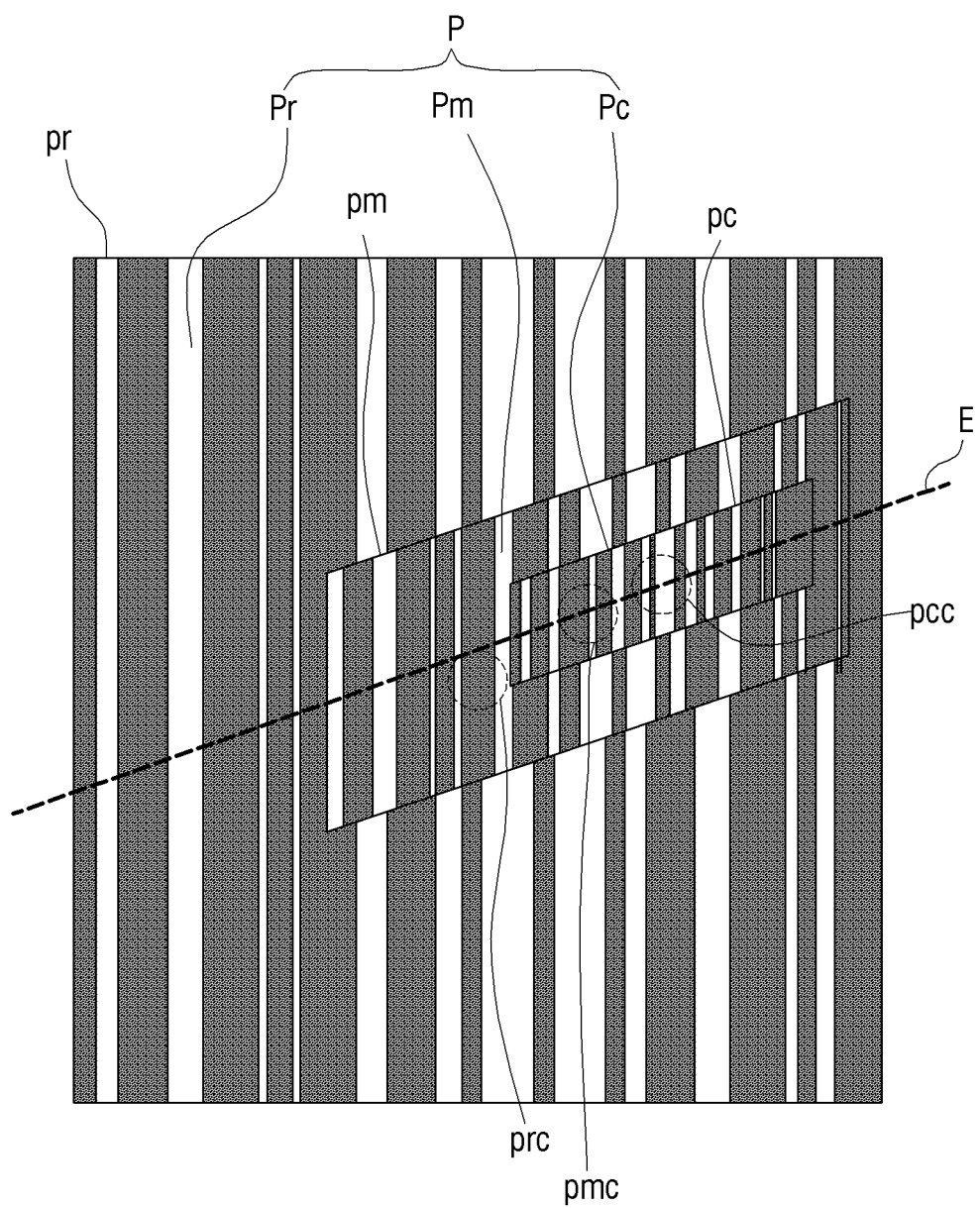
FIG. 3 shows an auto-focus detection pattern according to invention principles.

The light conveyed towards the focus detection system passes through the quick return mirror 11, is reflected on the sub mirror 12, and then is incident on the focus detection portion 16. So, if the photographer presses a release button (not illustrated) halfway while looking at an image of the subject displayed in the finder unit, the focus detection portion 16 automatically performs the focus detection based on the incident light of the subject about an auto-focusing area (not illustrated) that is selected automatically or manually, and then adjusts the focus by driving the photographing lens 20 through the contact portion 15a and the contact portion 20a based on the focus detection information. CPU 17 acquires information about brightness and contrast of the light of the subject being incident on the focus detection portion 16 and information about the auto-focusing area selected automatically or manually, for example. When determining that the brightness or contrast of the subject is low, the CPU 17 transmits an operation instruction signal to the CPU 33 of the flash apparatus 30 to direct the auxiliary light projection unit (source) 32 to project an auto-focus detection pattern P toward the subject. The focus detection unit 16 automatically enables performance of the focus detection as described above by detecting the auto-focus detection pattern P reflected from the subject, and performing a focus adjustment by driving the photographing lens 20 based on the focus detection information. Alternatively, determination of level of brightness or contrast of the subject is performed by the CPU 33 of the flash apparatus 30. If the release button (not illustrated) is pressed, the CPU 17 opens the shutter 13 by removing the quick return mirror 11 and the sub mirror 12 from the photographing optical path. As a result, an image of the subject formed by the photographing lens 20 is detected by the imaging component 14 comprising, for example, CCD, CMOS, so that the image can be acquired. As illustrated in FIG. 3, the auto-focus detection pattern P comprises a relatively sparse pattern region Pr (termed sparse pattern herein), a middle pattern region Pm, and a relatively compact pattern region Pc (termed compact pattern herein). The middle pattern region Pm is an auto-focus detection pattern in which the figures of pattern are denser than those of the sparse pattern region Pr (the figures of the pattern are closely spaced). The compact pattern region Pc is an auto-focus detection pattern in which the figures of pattern are denser than those of the middle pattern region Pm (the figures of the pattern are relatively closely spaced). The middle pattern region Pm is disposed so that the middle pattern region Pm is nested in the form of overlap within the sparse pattern region Pr. The compact pattern region Pc is disposed so that the compact pattern region Pc is nested in the form of overlap within the middle pattern region Pm.

In FIG. 3, the outline pr of the sparse pattern region Pr is an imaginary line drawn for the convenience of description to facilitate the understanding of the outskirts of the sparse pattern region Pr. Likewise, the outline pm of the middle pattern region Pm is an imaginary line drawn for the convenience of description to facilitate the understanding of the outskirts of the middle pattern region Pm. Likewise, the outline pc of the compact pattern region Pc is an imaginary line drawn for the convenience of description to facilitate the understanding of the outskirts of the compact pattern region Pc. Here, the center coordinates prc of the sparse pattern region Pr are center coordinates of the sparse pattern region Pr determined based on the outline pr of the sparse pattern region Pr. The outline pr of the sparse pattern region Pr is a square so that the center coordinates thereof are determined as the coordinates of an intersection point of two diagonal lines of the square. The center coordinates pmc of the middle pattern region Pm are center coordinates of the middle pattern region Pm determined based on the outline pm of the middle pattern region Pm. The outline pm of the middle pattern region Pm is a parallelogram so that the center coordinates pmc thereof are determined as the coordinates of an intersection point of two diagonal lines of the parallelogram. The center coordinates pcc of the compact pattern region Pc are center coordinates of the compact pattern region Pc determined based on the outline pc of the compact pattern region Pc. The outline pc of the compact pattern region Pc is a parallelogram so that the center coordinates pcc thereof are determined as the coordinates of an intersection point of two diagonal lines of the parallelogram. An epipolar line E is determined based on parallax between the photographing lens (the photographing optical system) 20 of the camera 10 and the projection system of the auxiliary light projection unit 32. The epipolar line E is a line corresponding to the optical axis of the photographing lens 20 of the camera 10 in the auto-focus detection pattern P.

The center coordinates prc of the sparse pattern region Pr, the center coordinates pmc of the middle pattern region Pm, and the center coordinates pcc of the compact pattern region Pc are separated from each other in the auto-focus detection pattern P considering the parallax between the photographing lens (the photographing optical system) 20 of the camera 10 and the projection system of the auxiliary light projection unit 32. So, in the auto-focus detection pattern P, the middle pattern region Pm and the compact pattern region Pc are disposed relatively narrowly and longitudinally along the epipolar line E. Also, in the auto-focus detection pattern P, the center coordinates pmc of the middle pattern region Pm and the center coordinates pcc of the compact pattern region Pc are placed near the epipolar line E. In the auto-focus detection pattern P, the center coordinates pmc of the middle pattern region Pm and the center coordinates pcc of the compact pattern region Pc are placed on the epipolar line E. The center coordinates prc of the sparse pattern region Pr, the center coordinates pmc of the middle pattern region Pm, and the center coordinates pcc of the compact pattern region Pc are placed on the epipolar line E in that respective order toward the upper right side of the auto-focus detection pattern P. The auto-focus detection pattern P improves robustness of detection of change of the focus distance and if the focus distance is changed, the auto focus adjustment can be achieved by using the auto-focus detection pattern P as described with reference to FIGS. 3 to 7. A center of the Pm region and a center of the Pc region are separated by a distance determined in response to difference in visual characteristics of the auto-focus detection pattern between when viewed (i) from an axis through the lens of a camera and (ii) from an axis through a focus pattern projection source. This is determined using known parallax and epipolar geometry.

In a particular case, the distance between pcc and pmc is defined as:

$$\text{distance} = K \times \left( \frac{1}{Zm} - \frac{1}{Zc} \right)$$

where K is a value defined by the optical design, Zm is pmc's mainly aiming distance, and Zc is pcc's mainly aiming distance, respectively.

Figure 4:
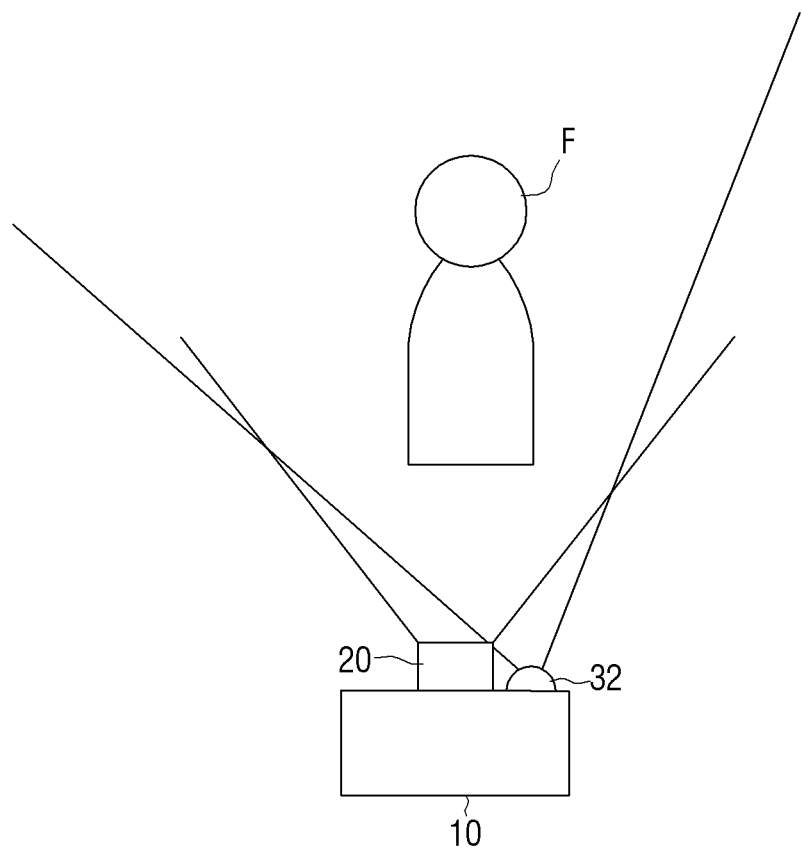
FIG. 4 shows a camera zoomed toward a wide-angle lens according to invention principles.
Figure 5:
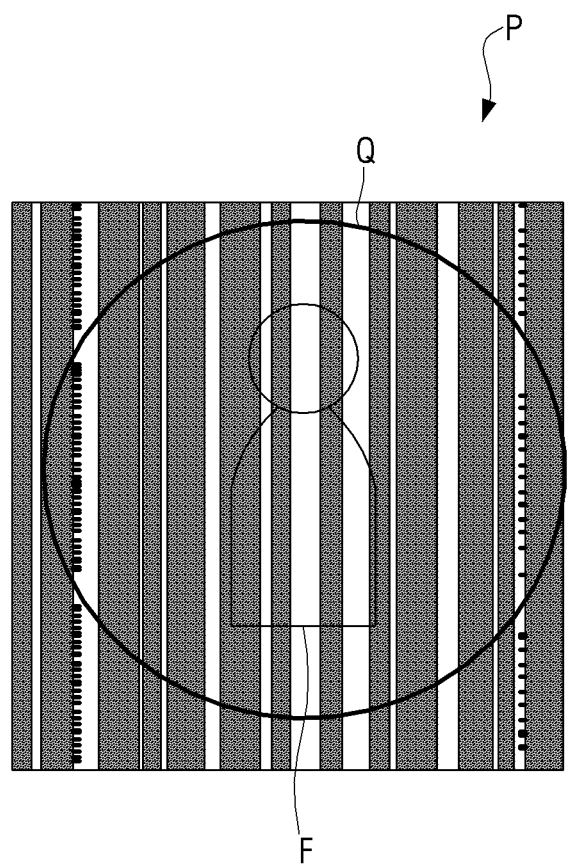
FIG. 5 shows a shape of a subject in a projection system when being zoomed toward a wide-angle lens according to invention principles.
Figure 6:
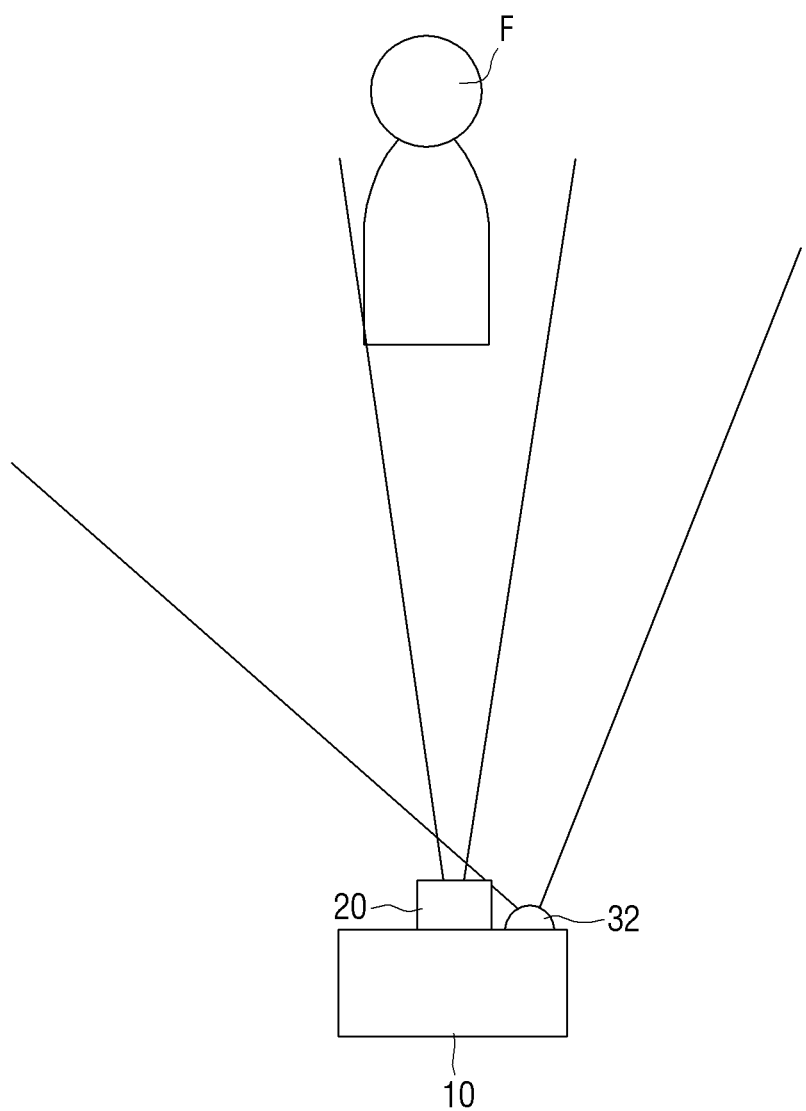
FIG. 6 shows a camera zoomed toward a telephoto lens according to invention principles.
Figure 7:
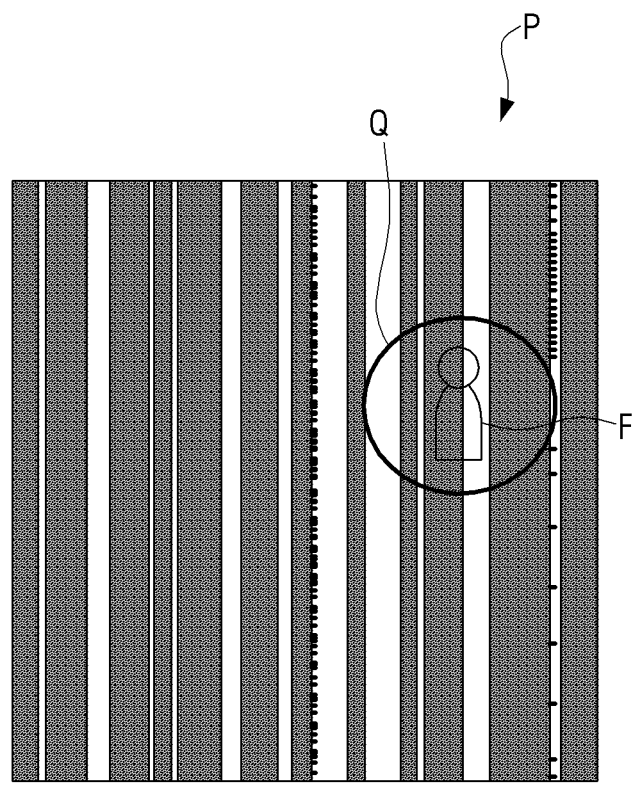
FIG. 7 shows a shape of a subject in a projection system when being zoomed toward a telephoto lens according to invention principles.

FIGS. 4 and 6 illustrate a subject F. In FIG. 4, if an image of the subject F is acquired using a wide-angle lens, as illustrated in FIG. 5, a range Q that functions effectively for auto-focus detection in the auto-focus detection pattern P (corresponding to the auto-focusing area) is approximately the same as the entire range of the auto-focus detection pattern P, and the center of the range Q is roughly the same as the center of the auto-focus detection pattern P. However, as illustrated in FIG. 6, when the subject F is picked up using a telephoto lens, as illustrated in FIG. 7, the range Q that functions effectively for the auto-focus detection in the auto-focus detection pattern P is a small region of the upper side of the right side of the auto-focus detection pattern P. Thus, the range Q that is used for auto-focus detection in the auto-focus detection pattern P is not fixed but moves and changes according to the change of the focus distance of the photographing lens 20. The pattern resolution and pattern position (the position of the range Q) suitable for auto-focus detection changes according to the focus distance of the photographing lens 20.

The change in range Q used for the auto-focus detection is described where the auxiliary light projection unit 32 is disposed at the top of the left side of the photographing lens 20 in the front view as illustrated in FIG. 2, and (a) the range Q is moved in the upper side of the right side of the auto-focus detection pattern P as the photographing lens 20 comprises a telephoto lens, and (b) the range Q is moved in the lower side of the left side of the auto-focus detection pattern P as the photographing lens 20 comprises a wide-angle lens. As illustrated in FIG. 3, the auto-focus detection pattern P may be high-resolution toward the upper side of the right side of the auto-focus detection pattern P, and may be low resolution toward the lower side of the left side of the auto-focus detection pattern P.

If the auxiliary light projection unit 32 is disposed at the top of the right side of the photographing lens 20 in the front view as illustrated in FIG. 2, (a) the range Q is moved to the upper side of the left side of the auto-focus detection pattern P when the photographing lens 20 comprises a telephoto lens, and (b) the range Q is moved to the lower side of the right side of the auto-focus detection pattern P as the photographing lens 20 comprises a wide-angle lens. The auto-focus detection pattern P may be relatively high-resolution toward the upper side of the left side of the auto-focus detection pattern P, and may be relatively low resolution toward the lower side of the right side of the auto-focus detection pattern P. The range Q (the auto-focusing area) is moved on the epipolar line E according to the focus distance during auto focus detection, so by placing the compact pattern region Pc or the middle pattern region Pm along the epipolar line E in FIG. 3, a portion of pattern P is enlarged when the photographing lens 20 is zoomed using a telephoto lens and may advantageously comprise a relatively high resolution supporting accurate focus detection when telephoto zooming is used. By placing the compact pattern region Pc or the middle pattern region Pm along the epipolar line E, the center coordinates pcc of the compact pattern region Pc and the center coordinates pmc of the middle pattern region Pm are placed near or on the epipolar line E. Consequently, the robustness of the auto-focus detection pattern P during change of focus distance is advantageously improved.

The system advantageously places a high resolution pattern in a portion that will be enlarged when being zoomed, improving the optical arrangement and the auxiliary light projection for auto focus. The high resolution pattern near the epipolar line E is used as the pattern for the auto-focus detection in response to change in focus distance to facilitate auto-focus detection. In contrast in known systems, zoom of an optical system results in a relatively low resolution, coarse auto-focus detection pattern impairing accuracy of auto-focus detection. The auxiliary light projection unit (auxiliary light projection apparatus) 32 is disposed in the camera (photographing apparatus) 10 having the focus detection portion (auto-focus detection device) 16, and the focus detection portion 16 projects the auto-focus detection pattern P to the subject F as auxiliary light for performing the auto-focus detection. The auto-focus detection pattern P includes the sparse pattern region Pr, the middle pattern region Pm that is denser than the sparse pattern region Pr, and the compact pattern region Pc that is denser than the middle pattern region Pm. In the auto-focus detection pattern P, the center coordinates prc of the sparse pattern region Pr, the center coordinates pmc of the middle pattern region Pm, and the center coordinates pcc of the compact pattern region Pc are separated to accommodate parallax between the photographing lens 20 (the photographing optical system) of the camera 10 and the projection system of the auxiliary light projection unit 32. The auto-focus detection pattern P adaptively accommodates movement of the auto-focusing area and change of focus distance of the photographing lens 20. The robustness of the auto-focus detection pattern P is improved for use in adapting to change of focus distance.

Figure 8:
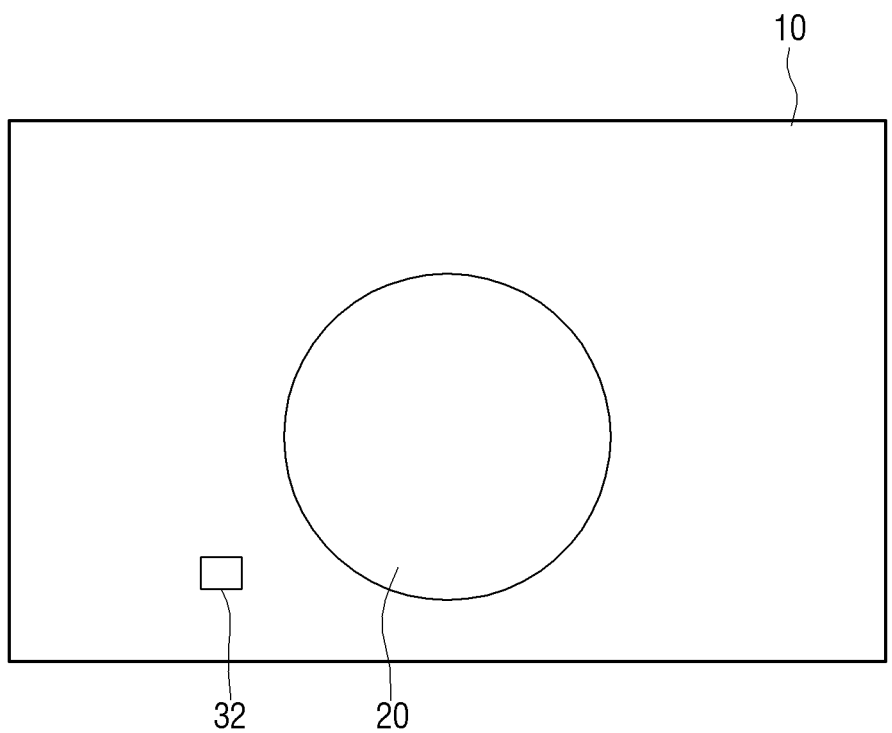
FIG. 8 shows a camera front view with a built-in auxiliary light projection unit according to invention principles.

In the auto-focus detection pattern P, the middle pattern region Pm and the compact pattern region Pc are arranged narrowly and longitudinally along the epipolar line E determined based on the parallax so the auto-focus detection pattern P reflects the movement of the auto-focusing area occurring due to change of the focus distance of the photographing lens 20. In the auto-focus detection pattern P, the center coordinates pmc of the middle pattern region Pm and the center coordinates pcc of the compact pattern region Pc are placed near the epipolar line E determined based on the parallax so pattern P closely reflects the movement of the auto-focusing area occurring due to change of the focus distance of the photographing lens 20. Further, the auxiliary light projection unit 32 may be built in the camera 10 as illustrated in FIG. 8.

Although a vertical stripe pattern P is described for use in auto-focus detection, alternative different patterns may be used as pattern P and although three pattern resolutions and shapes of regions, Pr, Pm, and Pc are described, the number of resolutions and pattern shape may be alternative different resolutions and shapes formed by nesting patterns of the same shape having two or four or more different resolutions, for example.

While the embodiments have been described, additional variations and modifications of the embodiments may occur to those skilled in the art. Therefore, it is intended that the appended claims shall be construed to include variations and modifications that fall within the spirit and scope of the system principles.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An auxiliary light projection system employed by a camera having an auto-focus detection unit, comprising:
   a light pattern generator configured to generate an auto-focus detection pattern, the auto-focus detection pattern comprising a first pattern region and a second pattern region that is denser than the first pattern region, and a center of the first pattern region and a center of the second pattern region are separated by a distance determined in response to difference in visual characteristics of the auto-focus detection pattern between when viewed (i) from an axis through the lens of a camera and (ii) from an axis through a focus pattern projection source; and
   a light pattern projection source configured to project the generated auto-focus detection pattern onto a subject enabling auto-focus detection.

2. The auxiliary light projection system of claim 1, wherein the visual characteristics comprises at least one of, position, direction, size and orientation of the auto-focus detection pattern and the first pattern region is larger than the second pattern region and encompasses the second pattern region and the visual characteristics result from parallax associated with separation of the lens of the camera and the focus pattern projection source.

3. The auxiliary light projection system of claim 1, wherein in the auto-focus detection pattern, the second pattern region is arranged longitudinally along an epipolar line determined in response to the difference in the visual characteristics and wherein the center of the second pattern region is substantially on or close to the epipolar line.

4. An auxiliary light projection system employed by a camera having an auto-focus detection unit, comprising:
   a light pattern generator configured to generate an auto-focus detection pattern, comprising a first pattern region, a second pattern region that is denser than the first pattern region, and a third pattern region that is denser than the second pattern region, and a center of the first pattern region, a center of the second pattern region and a center of the third pattern region are separated by a distance determined in response to difference in visual characteristics of the auto-focus detection pattern between when viewed (i) from an axis through the lens of a camera and (ii) from an axis through a focus pattern projection source; and
   a light pattern projection source configured to project the generated auto-focus detection pattern onto a subject enabling auto-focus detection.

5. The auxiliary light projection system of claim 4, wherein the visual characteristics comprises at least one of, position, direction, size and orientation of the auto-focus detection pattern and the first pattern region is larger than the second pattern region and encompasses the second pattern region and the second pattern region is larger than the third pattern region and encompasses the third pattern region and the visual characteristics result from parallax associated with separation of the lens of the camera and the focus pattern projection source.

6. The auxiliary light projection system of claim 5, wherein in the auto-focus detection pattern, the second pattern region and the third pattern region are arranged longitudinally along an epipolar line determined in response to the difference in the visual characteristics and wherein the center of the second pattern region and the center of the third pattern region are substantially on or close to the epipolar line.

7. A flash system that is mounted to camera having an auto-focus detection device, and emits a flash light, the flash system comprising:
   a light pattern generator configured to generate an auto-focus detection pattern, the auto-focus detection pattern comprising a first pattern region and a second pattern region that is denser than the first pattern region, and a center of the first pattern region and a center of the second pattern region are separated by a distance determined in response to difference in visual characteristics of the auto-focus detection pattern between when viewed (i) from an axis through the lens of a camera and (ii) from an axis through a focus pattern projection source; and
   a light pattern projection source configured to project the generated auto-focus detection pattern onto a subject enabling auto-focus detection.

8. The flash system of claim 7, wherein
   the visual characteristics comprises at least one of, position, direction, size and orientation of the auto-focus detection pattern and
   the first pattern region is larger than the second pattern region and encompasses the second pattern region and the visual characteristics result from parallax associated with separation of the lens of the camera and the focus pattern projection source.

9. The flash system of claim 7, wherein
   in the auto-focus detection pattern, the second pattern region is arranged longitudinally along an epipolar line determined in response to the difference in the visual characteristics and wherein the center of the second pattern region is substantially on or close to the epipolar line.

10. A flash system that is mounted to a photographing system having an auto-focus detection device, and emits a flash light based on an operation instruction of the photographing system, the flash system comprising:
    a light pattern generator configured to generate an auto-focus detection pattern, comprising a first pattern region, a second pattern region that is denser than the first pattern region, and a third pattern region that is denser than the second pattern region, and a center of the first pattern region, a center of the second pattern region and a center of the third pattern region are separated by a distance determined in response to difference in visual characteristics of the auto-focus detection pattern between when viewed (i) from an axis through the lens of the photographing system and (ii) from an axis through a focus pattern projection source; and
    a light pattern projection source configured to project the generated auto-focus detection pattern onto a subject enabling auto-focus detection.

11. The flash system of claim 10, wherein
    the visual characteristics comprises at least one of, position, direction, size and orientation of the auto-focus detection pattern and
    the first pattern region is larger than the second pattern region and encompasses the second pattern region and the second pattern region is larger than the third pattern region and encompasses the third pattern region and the visual characteristics result from parallax associated with separation of the lens of the photographing system and the focus pattern projection source.

12. The flash system of claim 10, wherein
in the auto-focus detection pattern, the second pattern region and the third pattern region are arranged longitudinally along an epipolar line determined in response to the difference in the visual characteristics and the center of the second pattern region and the center of the third pattern region are substantially on or close to the epipolar line.

13. A photographing system having an auto-focus detection device, the photographing system comprising:
a light pattern generator mounted to or built in the photographing system and configured to generate an auto-focus detection pattern, the auto-focus detection pattern comprising a first pattern region and a second pattern region that is denser than the first pattern region, and a center of the first pattern region and a center of the second pattern region are separated by a distance determined in response to difference in visual characteristics of the auto-focus detection pattern between when viewed (i) from an axis through the lens of a photographing system and (ii) from an axis through a focus pattern projection source; and
a light pattern projection source configured to project the generated auto-focus detection pattern onto a subject enabling auto-focus detection.

14. The photographing system of claim 13, wherein
the visual characteristics comprises at least one of, position, direction, size and orientation of the auto-focus detection pattern and
the first pattern region is larger than the second pattern region and encompasses the second pattern region and the visual characteristics result from parallax associated with separation of the lens of the photographing system and the focus pattern projection source.

15. A photographing system having an auto-focus detection device, the photographing system comprising:
a light pattern generator configured to generate an auto-focus detection pattern, comprising a first pattern region, a second pattern region that is denser than the first pattern region, and a third pattern region that is denser than the second pattern region, the second pattern region is larger than the third pattern region and encompasses the third pattern region and a center of the first pattern region, a center of the second pattern region and a center of the third pattern region are separated by a distance determined in response to difference in visual characteristics of the auto-focus detection pattern between when viewed (i) from an axis through the lens of a photographing system and (ii) from an axis through a focus pattern projection source; and
a light pattern projection source configured to project the generated auto-focus detection pattern onto a subject enabling auto-focus detection.

16. The photographing system of claim 15, wherein
in the auto-focus detection pattern, the second pattern region and the third pattern region are arranged longitudinally along an epipolar line determined in response to the difference in the visual characteristics and the center of the second pattern region and the center of the third pattern region are substantially on or close to the epipolar line.

17. A photographing system comprising:
an auto-focus detection device;
a photographing lens disposed in a front surface of the photographing system; and
a flash system that is disposed at a top and side of the photographing lens in the photographing system, and comprises an auxiliary light projection system to project an auto-focus detection pattern as an auxiliary light onto a subject enabling the auto-focus detection device to automatically detect focus, the auto-focus detection pattern, comprising a first pattern region, a second pattern region that is denser than the first pattern region, and a third pattern region that is denser than the second pattern region, the first pattern region is larger than the second pattern region and encompasses the second pattern region, the second pattern region is larger than the third pattern region and encompasses the third pattern region and a center of the first pattern region, a center of the second pattern region and a center of the third pattern region are separated by a distance determined in response to difference in visual characteristics of the auto-focus detection pattern between when viewed (i) from an axis through the photographing lens and (ii) from an axis through a focus pattern projection source.

18. The photographing system of claim 17, wherein the visual characteristics comprises at least one of, position, direction, size and orientation of the auto-focus detection pattern and the visual characteristics result from parallax associated with separation of the lens of the photographing system and the focus pattern projection source.

19. The photographing system of claim 17, wherein in the auto-focus detection pattern, the second pattern region and the third pattern region are arranged longitudinally along an epipolar line determined in response to the difference in the visual characteristics and the center of the second pattern region and the center of the third pattern region are substantially on or close to the epipolar line.

20. The photographing system of claim 19, wherein the epipolar line is a straight line that is inclined in the auto-focus detection pattern.

* * * * *